United States Patent [19]

Gummeringer

[11] Patent Number: 4,696,662

[45] Date of Patent: Sep. 29, 1987

[54] VARIABLE-SPEED DRIVE UNIT

[76] Inventor: Henry E. Gummeringer, 307 E. 121st St., Tacoma, Wash. 98445

[21] Appl. No.: 892,905

[22] Filed: Aug. 4, 1986

[51] Int. Cl.$^4$ ............................................. F16H 55/52
[52] U.S. Cl. ......................................... 474/49; 474/56
[58] Field of Search ..................... 474/49, 50, 52, 54, 474/56

[56] References Cited

U.S. PATENT DOCUMENTS

| 389,276 | 9/1888 | Yult et al. | 474/56 |
|---|---|---|---|
| 558,196 | 4/1896 | Muir | 474/56 |
| 1,032,803 | 7/1912 | Bader | 474/56 |
| 1,198,451 | 9/1916 | Juarez | 474/54 |
| 3,150,529 | 9/1964 | Walk | 474/56 |
| 4,068,539 | 1/1978 | NYC | 474/50 |
| 4,498,351 | 2/1985 | Ahoor | 474/49 x |

Primary Examiner—Stephen J. Novosad
Assistant Examiner—Thuy M. Bui
Attorney, Agent, or Firm—George J. Porter

[57] ABSTRACT

A variable-speed drive unit for a chain drive comprising a drive wheel (12) which contains a series of radially mounted threaded rods (14) which pass through internally threaded blocks (22), upon which are selectively mounted free wheeling sprockets (28) and rigidly connected driving sprocket segments (30); the radially inner end portions of the threaded rods (14) being rotatably mounted into a hub (10) and rigidly attached to a primary bevel gear (34) which engages secondary bevel gears (36) (38) mounted on either side thereof; the secondary bevel gears (36) (38) being attached to actuator disks (40) (42) mounted on either side of the unit; the actuator disks (40) (42) being disposed for selective engagement by spring biased actuator arms (54) (56) whereby the associated bevel gears (34) (36) (38) will be rotated thus moving the blocks (22) selectively up or down the threaded rods (14) so as to effectively vary the diameter of a circle described by the chain sprockets (28) and sprocket segments (30) as they are rotated.

7 Claims, 10 Drawing Figures

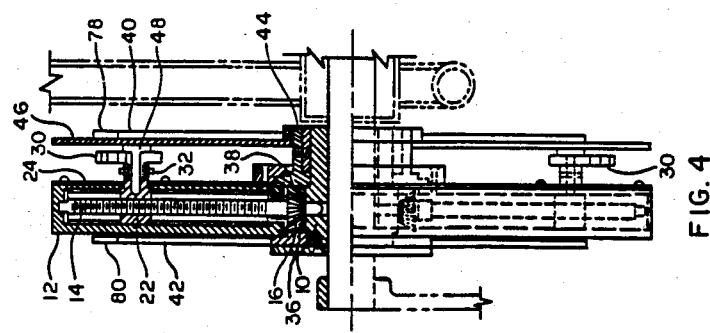
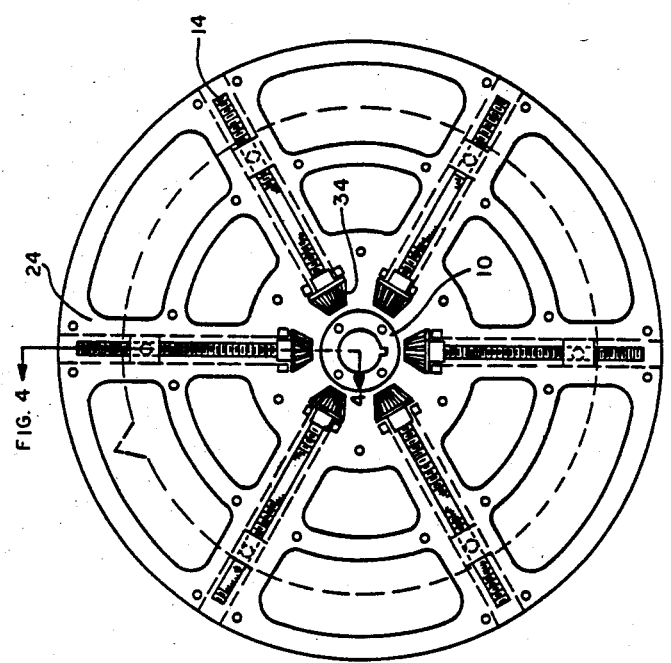

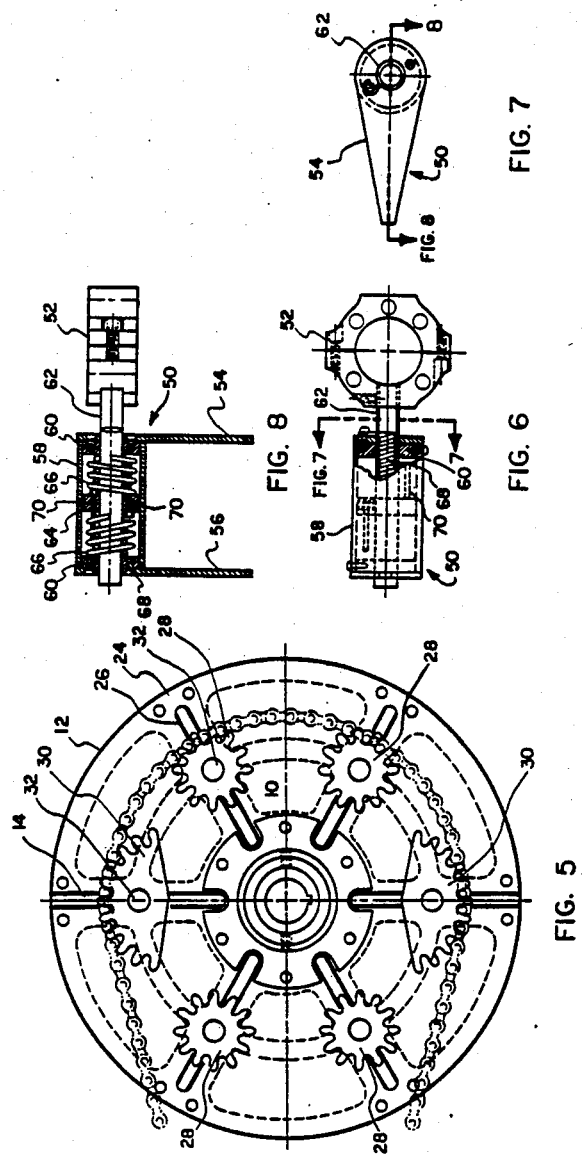

VARIABLE-SPEED DRIVE UNIT

FIELD OF THE INVENTION

This invention relates generally to a semiautomatic variable-speed drive unit for the transmission of power from a rotary driving shaft to a rotary driven shaft, and more particularly to a variable-speed drive unit for use on bicycles.

BACKGROUND OF THE INVENTION

Presently most bicycle transmission utilize front and rear sprockets having a series of sprocket drives of various diameters. These devices utilize derailleurs to move a drive chain between sprocket drives of selected diameters so as to provide the desired drive ratio. As is well known these types of transmissions, commonly referred to as derailleur systems, have many drawbacks. These systems are difficult to operate, they are noisy, they are delicate, and because of chain misalignment in some gears, they are inefficient.

For these reasons several attempts have been made to provide improved transmission, some of which involve the use of variable sprockets. Examples of these may be found in U.S. Pat. Nos. 3,850,044; 3,867,851; 3,994,180; 4,167,124; 4,493,678; 4,498,351; and 4,521,207. Other related expansible pulleys may be found in U.S. Pat. Nos. 885,710; 1,119,746; 1,144,381; 1,205,020; 3,279,271; and 4,068,539. For the most part these devices have failed to be commercially successful because of their complexity, high cost, and weight, and even more importantly, their difficulty of operation. It is therefore the object of the present invention to overcome these and other shortcomings and to provide a durable variable-speed drive unit, the operation of which is extremely simple and smooth.

SUMMARY OF THE INVENTION

A variable-speed drive unit for providing a plurality of drive rations which is particularly well suited for use on bicycles. The drive unit comprises a drive wheel which contains a series of radially mounted threaded rods which pass through internally threaded blocks upon which are mounted sprockets and sprocket segments, the sprockets being rotatably attached and the sprocket segments being rigidly attached. the radially inner end portions of the threaded rods are rotatably mounted into a hub portion and each is rigidly attached to a primary bevel gear. Matching secondary bevel gear segments are mounted on either side of each primary bevel gear segment. The secondary bevel gear segments are rotated by actuator disks rotatably mounted on either side of the drive wheel. A shifter cam mechanism is slidably mounted on either side of the drive wheel so as to be selectively engagable with the actuator disks. Thus as the drive wheel is rotated, engagement of the shifter cam mechanism with one or the other of the actuator disks will stop the disk. The continued rotation of the drive wheel then causes the rotation of the bevel gears which in turn rotate the threaded rods. As the threaded rods rotate within the internally threaded blocks, the blocks are moved radially inwardly or outwardly, thus changing the effective diameter of the circle described by the sprockets and sprocket segments as they are rotated.

BRIEF DESCRIPTION OF THE DRAWINGS

FIG. 3 is an elevational view of the variable-speed drive unit with a portion removed to illustrate the arrangement of the elements within the device.

FIG. 4 is an end elevational view of the variable-speed drive unit with a partial vertical section taken substantially along line 4—4 of FIG. 3 and with portions shown in phantom.

FIG. 5 is a side elevational view of the variable-speed drive unit with portions removed to more clearly show the arrangement of the inner elements of the device.

FIG. 6 is an elevational view of the actuator mechanism of the variable-speed drive unit and its mount.

FIG. 7 is an end elevation of the variable-speed drive unit actuator mechanism taken along line 7—7 of FIG. 6.

FIG. 8 is a sectional view of the variable-speed drive unit actuator taken along line 8—8 of FIG. 7.

DETAILED DESCRIPTION OF THE DRAWINGS

Figure 1:
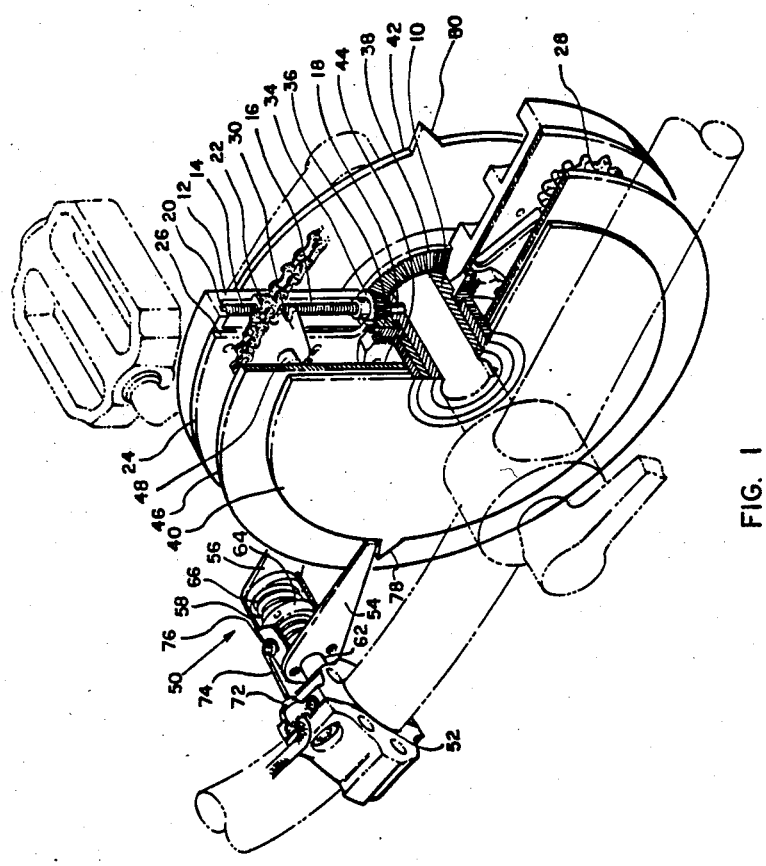
FIG. 1 is a perspective view of the variable-speed drive unit with portions cut away to illustrate the inner structure of the device and with portions of a bicycle shown in phantom to illustrate such an application of the unit.
Figure 2:
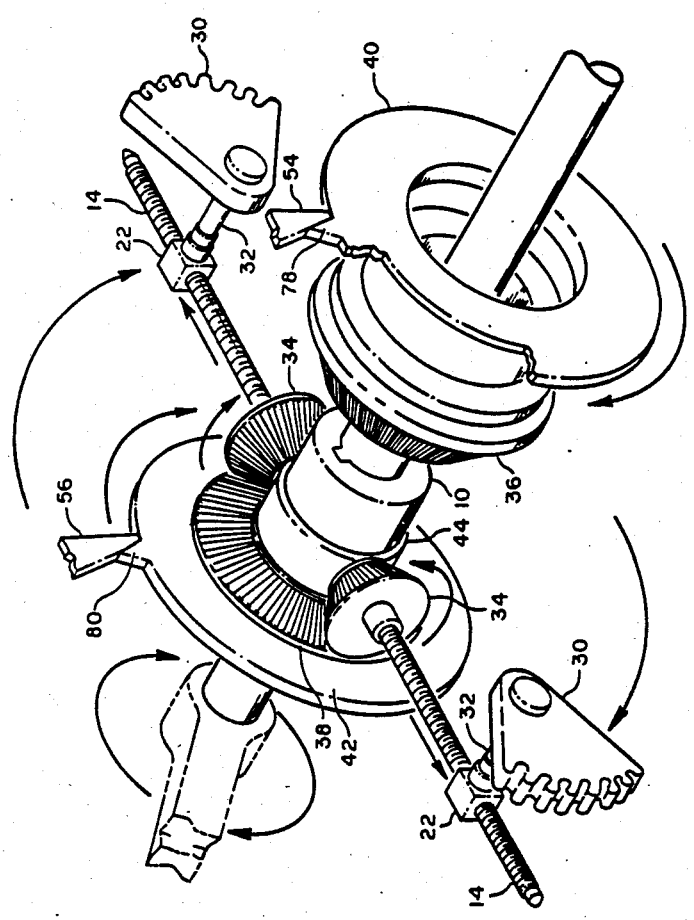
FIG. 2 is an exploded view of the variable-speed drive unit illustrating the function of some major elements of the device.

As best illustrted in FIG. 1 a hub 10 is adapted for driving connection to a drive shaft such as on a bicycle crankshaft as shown in phantom, or any shaft driven device wherein a variable-speed drive unit may be utilized. A drive wheel 12 is mounted in driving relationship to the hub 10 by a series of threaded rods 14 which, as shown in FIGS. 3 and 5, extend radially from the hub and are equally spaced radially so that each rod is positioned radially opposite from another rod. The threaded rods 14 are located within slide grooves 16 formed in drive wheel 12 and are rotatably attached to the hub 10 at their radially inner ends 18, and to the drive wheel 12 at their radially outer ends 20. Each rod 14 has a boss 22 in threaded engagement therewith. These bosses 22 are slidably mounted in slide grooves 16 so as to move selectively radially inwardly or outwardly by rotation of threaded rods 14. The bosses 22 are attached to sprockets 28 or to sprocket sections 30 by shanks 32 in a manner which will be described in detail later in this specification. The bosses 22 are maintained in position by a retainer plate 24 having slots 26 which are dimensioned for passage of the shanks 32 and retention of the bosses 22. As best shown in FIG. 5 the illustrated device includes two sprocket segments 30 positioned radially opposite one another, and four fully formed sprockets 28, each of which is positioned radially opposite another sprocket 28. As best illustrated in FIG. 2 the sprocket segments 30 are rigidly attached to their respective shanks 32 and bosses 22 to provide a driving connection. Sprockets 28 on the other hand are rotatably connected to shanks 32 and serve only to maintain the circular drive chain configuration and to provide lateral guidance for the chain. It will be readily appreciated that the function of the sprockets 28 could as well be accomplished by wheels or slides, and that while the illustrated unit utilizes four such devices, the number could also be varied as desired. It is of course necessary to include at least two radially opposed rigidly mounted sprocket segments 30 so as to maintain a continuous driving relationship with the chain. While these rigidly mounted driving elements are formed as segments of sprockets to conserve space, a complete sprocket could also be utilized as desired.

A primary bevel gear 34 is rigidly attached to the radially inner end of each of the threaded rods 14. A pair of rotatably mounted secondary bevel gears 36, 38 are mounted one on either side of the primary bevel gears in driving relationship therewith. The secondary bevel gears 36, 38 are rigidly aattached to actuator disks 40, 42, respectively. As best illustrated in FIG. 1 secondary bevel gear 36 is attached to actuator disk 40 by a sleeve 44 while secondary bevel gear 38 is attached directly to actuator disk 42. Thus it will be seen that the actuator disks and the secondary bevel gears are free to rotate with respect to the remainder of the device. The details of the connections between the actuator disk and the secondary bevel gears is best illustrated in FIG. 4. As best illustrated in FIGS. 1 and 4 a free floating protector plate 46 is mounted between actuator disk 40 and extended portions 48 of shanks 32.

A shifter cam assembly 50 is utilized to engage the actuator disks 40 and 42. As will be noted in FIG. 1 this assembly is rigidly mounted to a frame member by a clamp type bracket 52. As best illustrated in FIGS. 1 and 8, the shifter cam assembly 50 consists of a pair of cam actuatr arms 54, 56 which are connected to either end of a tube 58 by screws which thread into tube end caps 60. A shaft 62 attached to bracket 52 serves as a pivotal support for the tube 58. A limit sleeve 64 is rigidly attached to shaft 62. The tube 58 is rotatably attached to the shaft 62 by means of torsion springs 66 which are designed to allow rotation of tube 58 about shaft 62 only after a predetermined force is applied to cam actuator arms 54 or 56. A pair of compression springs 68 are positioned within the torsion springs 66 and serve to center the tube with respect to sleeve 64 and to bias lateral movement of the tube 58 with respect to shaft 62 by exerting a balanced force between limit sleeve 64 and end caps 60. Adjustable limit screws 70 are laterally threaded through limit sleeve 70 and serve to adjustably limit the lateral movement of the tube 58 with respect to the limit sleeve 64. A cable housing 72 is rigidly attached to mounting bracket 52 and houses a movable cable 74 which is attached to tube 58 by a screw 76. Thus, as best illustrated in FIG. 1 the cam arms 54, 56 are normally in a centered position just outside cam lobes 78, 80 which are an integral part of actuator disks 40, 42. It is therefore apparent that operation of the cable 74 will move the tube 58 in a lateral direction so as to engage the cam actuator arms 54, 56 with one or the other of the cam lobes 78, 80.

Figure 10:
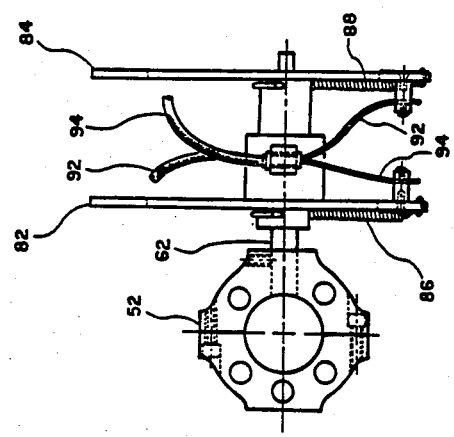
FIG. 10 is an elevational view of the alternative actuator mechanism illustrated in FIG. 9, along with its mount.
Figure 9:
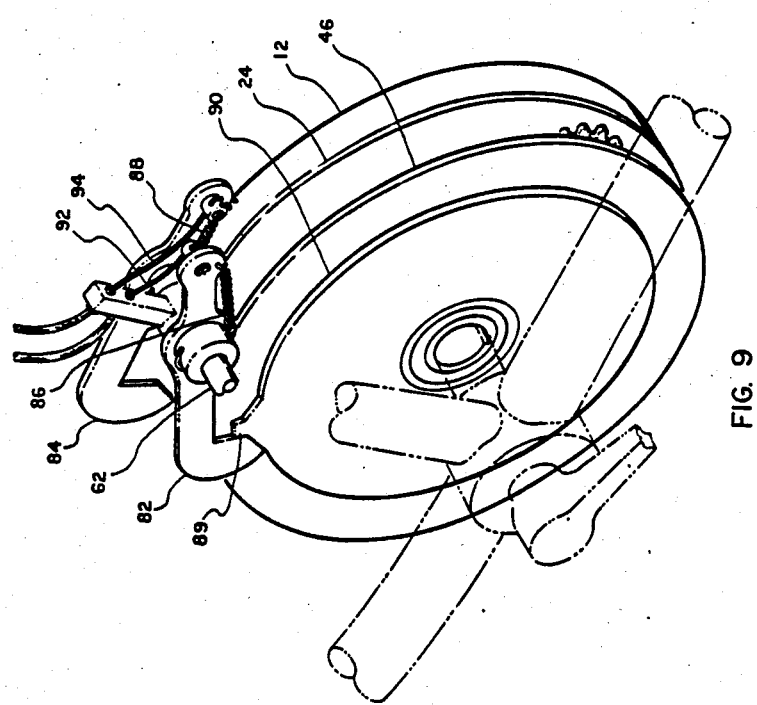
FIG. 9 is a perspective view of the variable-speed drive unit with portions of a bicycle shown in phantom and illustrating an alternative actuator mechanism.

FIGS. 9 and 10 illustrate an alternative actuator mechanism wherein actuator arms 82 and 84 are pivotally mounted on shaft 62. The arms 82, 84 are normally biased in a disengaged position by tension springs 86,88 during constant speed operation. As illustrated in FIG. 9 the arms 82, 84 may be selectively engaged, such as arm 82 is with cam lobe 89 of actuator disk 90, by selective operation of one or the other of the cables 92, 94. The angular relationship between the contacting portion of an actuator arm and its cam lobe is such that sufficient pressure may be applied to the respective actuator disk to cause a ratio change. However, as with the first described actuator mechanism this angular relationship will allow the arms to disengage from the cam lobe when a greater than normal pressure is applied such as when the ratio change has reached one or the other of the extremes permitted by the drive unit.

OPERATION

During constant speed operation of the variable-speed drive, cam actuator arms 54, 56 are laterally centered outside the cam lobes 78, 80. A ratio or speed change would be made by moving cable 74 selectively inwardly or outwardly so as to engage one or the other of the cam actuator arms 54, 56 with its adjacent cam lobe 78 or 80. For example, while rotation of the unit is continued, the engagement of cam actuator arm 54 with cam lobe 78 as illustrated in FIG. 1 would cause the actuator disk 40 and secondary bevel gear 36 to stop, thus causing rotation of the primary bevel gears 34 and their associated threaded rods 14. It will be noted that such rotation of the primary bevel gear will cause the secondary bevel gear 38 and its associated actuator disk 42 to rotate in the opposite direction. Rotation of the threaded rods 14 will cause radial movement of the bosses 22 and their associated chain sprockets and chain sprocket segments. As best illustrated in FIG. 5 the driving force to the chain is provided by the chain sprocket segments 30, at least one of which is engaged with the chain at all times. A sufficient spacing between the teeth of the sprocket segments and the chain links is provided so as to prevent binding between the chain and the sprocket segments during that brief period of time in which both sprocket segments are engaged with the chain at once. Thus it will be seen that the remainder of the ratio change is accomplished while only one of the sprocket segments is engaged with the chain. It is critical therefore that an exact relationship between the pitch of the threads on the threaded rods 14 be matched to the desired ratio change for each revolution of the unit as well as to the chain link spacing. For example, in a typical embodiment one rotation of the drive wheel results in what may be referred to as one gear change. As previously mentioned the number of the threaded rods which carry the rotatable chain sprockets may be varied, and wheels or suitable slides could be used in place of the chain sprockets. The change in diameter of the variable-speed drive unit of course requires a change in the effective length of the chain. This change is accommodated in the conventional way by use of a free wheeling spring biased sprocket at any convenient location along the chain. Such a chain length adjusting system is commonly used on bicycle derailleur systems. Whem the desired ratio or speed has been reached the operator of the unit removes the pressure which was applied to actuate cable 74 and the compression springs 68 within tube 58 center the tube 58 so as to disengage the contact between the cam actuator arm 54 and cam lobe 78. If a cam actuator arm is held in engagement with a cam lobe until the bosses 22 have reached either end of threaded rods 14, the cam lobe would exert sufficient pressure on the cam actuator to deflect torsion springs 66 which would permit the actuator arms to temporarily swing out of the path of the cam lobe, thus preventing breakage of any element in the unit. In this event the operator would be made aware of the situation by the audible snap of an acutator arm passing over a cam lobe.

Except for the previously described pivotal action or arms 82 and 84 the device utilizing the alternative actuator mechanism illustrated in FIGS. 9 and 10 operates in substantially the same manner as that described immediately above.

As will be noted by one skilled in the art, the device described above is semiautomatic in that the driving ratio continues to change the equivalent of one gear for each rotation of the drive wheel so long as the shifter cam mechanism remains engaged.

It also will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

I claim:
1. A variable-speed drive unit comprising:
   a hub adapted for driving connection to a shaft;
   a drive wheel;
   a series of radially extending threaded rods rotatably mounted between said hub and said drive wheel;
   a primary bevel gear rigidly mounted to the radially inner end of each of said threaded rods;
   a pair of secondary bevel gears, each of said secondary bevel gears being rotatably mounted around said hub, and in driving engagement with said primary bevel gear;
   an actuator disk rigidly attached to each of said secondary bevel gears;
   an internally threaded boss means threadedly attached to each of said threaded rods and slidably mounted to said drive wheel;
   a pair of chain sprocket segments, each of said segments rigidly attached to said boss means on radially opposite threaded rods;
   a chain sprocket rotatably atttached to each of said threaded bosses which are not attached to said sprocket segments; and
   an actuator cam means adapted for selective engagement with one or the other of said actuator disks whereby rotation of said hub and drive wheel during said engagement will cause rotation of said threaded shafts resulting in selective radially inward or outward movement of said chain sprocket segments and chain sprockets.
2. A variable-speed drive unit comprising:
   a drive wheel having a centered aperature;
   a hub means mounted within said aperature;
   radially adjusted drive means mounted in driving connection between said drive wheel and said hub; and
   a pair of actuator means drivably connected to said radially adjustable drive means and rotatably mounted to said hub, on actuator means of said pair of actuator means being located on each side of said drive wheel whereby selective actuation of one or the other actuator means of said pair of actuator means will move said radially adjustable drive means selectively radially inwardly or outwardly.
3. The variable-speed drive unit defined in claim 2 wherein said drive wheel is provided with a plurality of equally spaced radial slide grooves formed therein and wherein said radially adjustable drive means comprises:
   threaded rods located within each of said radial slide grooves;
   a sliding block in threaded engagment with each of said threaded rods; and
   at least two radially opposed sprocket segments rigidly attached to said sliding blocks.
4. The variable-speed drive unit defined in claim 3 wherein said radially adjustable drive means further comprises:
   a primary bevel gear rigidly attached to the radially inner end of each of said threaded rods;
   a pair of secondary bevel gears, each gear of said pair of secondary bevel gears being rigidly attached to one actuator means of said pair of actuator means; and
   each of said secondary bevel gears being mounted on opposite sides and in driving engagement with said primary bevel gears.
5. The variable-speed drive unit defined in claim 4 wherein each actuator means of said pair of actuator means comprises:
   a disk having a cam lobe thereon;
   a cam actuator are adapted for mounting outside the periphery of said drive wheel; and
   a spring biased means rigidly attached to each of said cam actuator arms and adapted for biased limited movement for selective engagement and disengagement of said cam actuator arms with said cam lobes.
6. The variable-speed drive unit defined in claim 5 wherein said spring biased means comprises:
   a shaft; and
   a tube rotatably and slidably mounted on said shaft and rigidly connecting said cam actuator arms; a plurality of springs attached between said shaft and said tube, said springs being adapted to permit biased rotational as well as lateral movement of said tube with respect to said shaft.
7. The variable-speed drive unit defined in claim 5 wherein said spring biased means comprises:
   a shaft;
   a pair of cam actuator arms pivotally mounted on said shaft; and
   a spring connected to each of said cam actuator arms, said spring being adapted to permit biased rotational movement of said arms with respect to said shaft.

* * * * *